US008867985B2

(12) United States Patent
Yang et al.

(10) Patent No.: US 8,867,985 B2
(45) Date of Patent: Oct. 21, 2014

(54) METHOD FOR RELAYING DATA IN MULTI-HOP CELLULAR SYSTEM

(75) Inventors: Suck-Chel Yang, Gyeonggi-Do (KR); Seong-Lyun Kim, Soul (KR); Jun-Ho Jo, Gyeonggi-Do (KR); Young-Ju Hwang, Soul (KR); Seung-Woo Ko, Soul (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 466 days.

(21) Appl. No.: 13/264,072

(22) PCT Filed: Apr. 29, 2010

(86) PCT No.: PCT/KR2010/002705
§ 371 (c)(1),
(2), (4) Date: Oct. 12, 2011

(87) PCT Pub. No.: WO2010/126312
PCT Pub. Date: Nov. 4, 2010

(65) Prior Publication Data
US 2012/0040607 A1 Feb. 16, 2012

(30) Foreign Application Priority Data
Apr. 30, 2009 (KR) .................. 10-2009-0038551

(51) Int. Cl.
*H04B 7/15* (2006.01)
*H04W 40/22* (2009.01)
*H04W 40/12* (2009.01)

(52) U.S. Cl.
CPC .............. *H04W 40/22* (2013.01); *H04W 40/12* (2013.01)
USPC ........................... 455/11.1; 455/13.1; 455/16

(58) Field of Classification Search
CPC ..... H04W 40/22; H04W 40/12; H04B 7/2606
USPC ................ 455/3.02, 427, 428, 430, 431, 7–9, 455/11.1, 12.1, 13.1, 13.2, 14–17; 370/226, 370/293, 246, 274, 279, 315, 316, 492, 370/501; 340/425.1
See application file for complete search history.

(56) References Cited

U.S. PATENT DOCUMENTS

| 7,593,376 | B2 * | 9/2009 | D'Amico et al. ............. 370/338 |
| 8,102,761 | B2 * | 1/2012 | Yamaguchi et al. .......... 370/225 |
| 2007/0280172 | A1 | 12/2007 | Tan et al. |
| 2008/0056199 | A1 | 3/2008 | Park et al. |
| 2008/0101325 | A1 * | 5/2008 | Bao et al. ...................... 370/345 |
| 2008/0107075 | A1 | 5/2008 | Ramachandran et al. |

* cited by examiner

*Primary Examiner* — Dominic E Rego
(74) *Attorney, Agent, or Firm* — Birch, Stewart, Kolasch & Birch, LLP

(57) ABSTRACT

Disclosed is a method for relaying data in a multi-hop cellular system, the method including receiving by a terminal from a base station a notification as to whether the terminal is decided as a candidate for a relay, deciding by the terminal whether to be a representative candidate terminal for the relay according to a channel state with the other terminals within a coverage of the base station if the terminal is decided as the candidate for the relay, sending by the terminal to the base station a notification if the terminal is decided as the representative candidate terminal, and relaying data received from the other terminals to calculate relay probability terminals to the base station if the terminal is notified from the base station as to that the terminal is finally decided as the relay.

8 Claims, 3 Drawing Sheets

METHOD FOR RELAYING DATA IN MULTI-HOP CELLULAR SYSTEM

TECHNICAL FIELD

The present invention relates to relaying signals in a multi-hop cellular system.

BACKGROUND ART

Many wireless communication technologies have been introduced for high-speed mobile communications.

Cooperatively, cells are getting narrower in radius to support high-speed communications and more telephony communications. Here, it is expected that employment of a centralized architecture using the current wireless network architecture is unable. Accordingly, the next generation communication system should be dispersively controlled and actively deal with environmental changes such as addition of a new base station.

To this end, a multi-hop cellular system has been proposed.

FIG. 1 illustrates a multi-hop cellular system according to the related art.

As shown in FIG. 1, one or more terminals 11, 12 and 13 are present within a coverage area of a base station 30.

Here, one or more specific terminals of the one or more terminals 11, 12 and 13 may operate as a relay. A terminal operating as the relay is in a good channel circumstance and has a high channel gain on the average.

That is, if a terminal present in a good channel circumstance operates as a relay, another terminal present in a bad channel circumstance may execute data transmission and reception with the base station via the terminal operating as the relay.

The method of utilizing a terminal as a relay in the cellular system allows improvement of transmission performance. That is, a terminal functioning as a relay may amplify a data signal to forward to each receiving end such that terminals located within a base station coverage can communicate with the base station more stably, resulting in improvement of the transmission performance.

As such, to decide whether to render a specific terminal operate as a relay, there are been algorithms, such as a centralized routing related to a direct decision by a base station and a distributed routing related to a decision by the terminal itself.

The centralized routing is an algorithm in which a base station receives channel gain information fedback from terminals and made a decision so as to notify each terminal of the decision. To this end, each terminal periodically informs channel information thereof, channel information relating to the base station and channel information between each terminal and the base station.

However, upon employing the centralized routing algorithm, the base station should be fedback incredibly a lot of channel information from terminals, and suffers from a huge load upon calculation of the fedback channel information. If the base station randomly makes a decision without feedback of the channel information, a gain by virtue of the centralized routing is rarely expected.

Hereinafter, the distributed routing will be described with reference to FIG. 2.

FIG. 2 is an exemplary view illustrating a distributed routing in the multi-hop cellular system according to the related art.

As shown in FIG. 2, the distributed routing is configured such that each terminal independently decides whether to function as a relay.

If the base station measures channel gains between terminals and the base station and broadcasts it to the terminals, each of the terminals randomly decides whether to function as a relay. Each terminal has its own relay probability, which is decided based upon channel gain information sent from the base station and a data rate of a packet to be sent.

However, upon employing the distributed routing, since the base station has already known such channel information, there is no need to perform the distributed routing. In addition, each of the terminals performs routing without knowing channel information relating to the other terminals, which causes a blind routing. Accordingly, such situation gives limitations of the gain.

DISCLOSURE OF INVENTION

Technical Problem

Therefore, an object of the present invention is to overcome the problems of the related art. That is, an object of the present invention is to solve those problems of the centralized routing and the distributed routing.

In other words, an object of the present invention is to reduce the load of the base station and simultaneously increase the gains of terminals in a multi-hop relay cellular system.

Another object of the present invention is to increase frequency efficiency of a terminal and reduce a load of a base station due to a centralized routing upon uplink transmission of the terminal, in a multi-hop cellular system.

Solution to Problem

To achieve those objects and other advantages of the present invention, there is provided a method for relaying data in a multi-hop cellular system, the method including receiving by a terminal from a base station a notification as to whether the terminal is decided as a candidate for a relay, deciding by the terminal whether to be a representative candidate for the relay according to a channel state with the other terminals within a coverage of the base station if the terminal is decided as the candidate for the relay, sending by the terminal to the base station a notification if the terminal is decided as the representative candidate for the relay, and relaying data received from the other terminals to the base station if the terminal is notified from the base station as to that the terminal is finally decided as the relay.

The deciding step may include measuring by the terminal the channel state with the other terminals, calculating a probability to be selected as the relay based upon the channel state, and deciding whether to be the representative candidate based upon the calculated probability.

In the deciding step, if the calculated probability exceeds a preset threshold value, the terminal may be decided as the representative candidate. In the deciding step, the terminal may concern about the amount of uplink data to be sent. Here, the amount of the uplink data may be concerned prior to the channel state with the other terminals.

To achieve those object and other advantages of the present invention, there is provided a method for deciding a relay in a multi-hop cellular system, the method including a) deciding and notifying by a base station at least one candidate terminal for a relay among several terminals within coverage of the base station, b) receiving by the base station a notification from the decided at least one candidate terminal for the relay as to whether to be a representative candidate terminal for the relay, c) deciding by the base station a specific terminal to operate as the relay among the candidates, and d) broadcasting the information related to the terminal to operate as the relay to the several terminals within the base station.

In the candidate terminal deciding step, the base station may concern about a link quality with the candidate terminal and an uplink data rate from the candidate terminal.

In the relay candidate terminal deciding step, the base station may limit the number of candidate terminals.

The steps a) to d) may be repeatedly executed every preset frame section. The frame may be composed of a plurality of time slots, a plurality of transmission time intervals (TTIs) or a plurality of subframes.

Also, the steps a) to d) may be repeatedly executed every preset period.

In the final deciding step of the relay, the number of terminals to operate as the relay may be set based upon an amount of uplink data from the other terminals within the base station.

Advantageous Effects of Invention

The random routing method according to the present invention can reduce complicated signaling and calculation complexity which may be caused in a centralized routing method, and also prevent lowering of gains which may be caused in a distributed routing method.

Also, the random routing method according to the present invention employs a semi-centralized routing which accepts only advantages of the centralized routing and the distributed routing, which allows reduction of a load applied to a base station and damages due to blind routing, resulting in increasing a decoding probability of uplink signals in the base station and enhancing transmission performance in a cellular system introducing a terminal relay.

MODE FOR THE INVENTION

Figure 1:
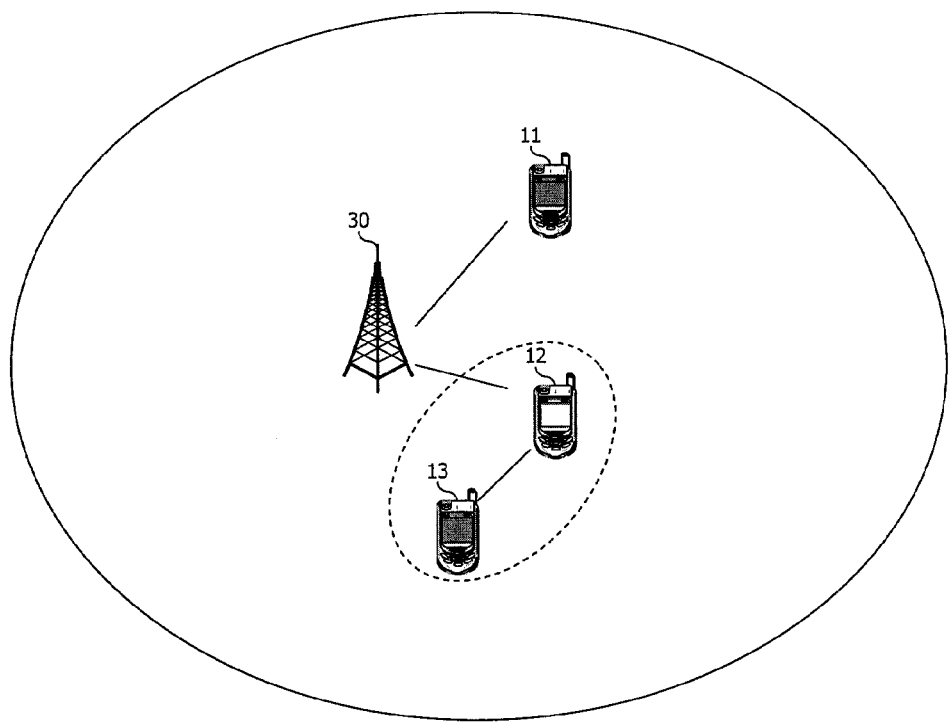
FIG. 1 is a view illustrating a multi-hop cellular system according to the related art.
Figure 2:
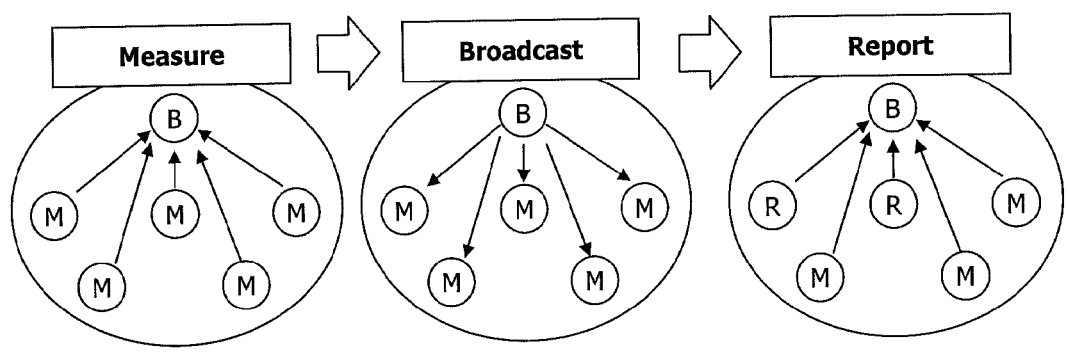
FIG. 2 is an exemplary view illustrating a distributed routing algorithm in the related art multi-hop cellular system.

The present invention may be applicable, with no limit to this, to any communication system, for example, $3^{rd}$ generation partnership project (3GPP) long term evolution (LTE), IEEE standard, Ad-Hoc network and the like, to which the technical scope of the present invention is applicable.

Technical terms used in this specification are used to merely illustrate specific embodiments, and should be understood that they are not intended to limit the present invention. As far as not being defined differently, all terms used herein including technical or scientific terms may have the same meaning as those generally understood by an ordinary person skilled in the art to which the present invention belongs to, and should not be construed in an excessively comprehensive meaning or an excessively restricted meaning. In addition, if a technical term used in the description of the present invention is an erroneous term that fails to clearly express the idea of the present invention, it should be replaced by a technical term that can be properly understood by the skilled person in the art. In addition, general term used in the description of the present invention should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, the element can be directly connected with the other element or intervening elements may also be present. In contrast, when an element is referred to as being "directly connected with" another element, there are no intervening elements present.

Embodiments of the present invention will be described below in detail with reference to the accompanying drawings, where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

Hereinafter, a terminal is illustrated, and the terminal may be also called user equipment (UE), mobile equipment (ME), or mobile station (MS). In addition, the terminal may be a mobile device having a communication function such as mobile phones, personal digital assistants (PDAs), smart phones, laptop computers, and the like, or may be a device that cannot be carried around such as personal computers (PCs) or a vehicle-mounted device.

Figure 3:
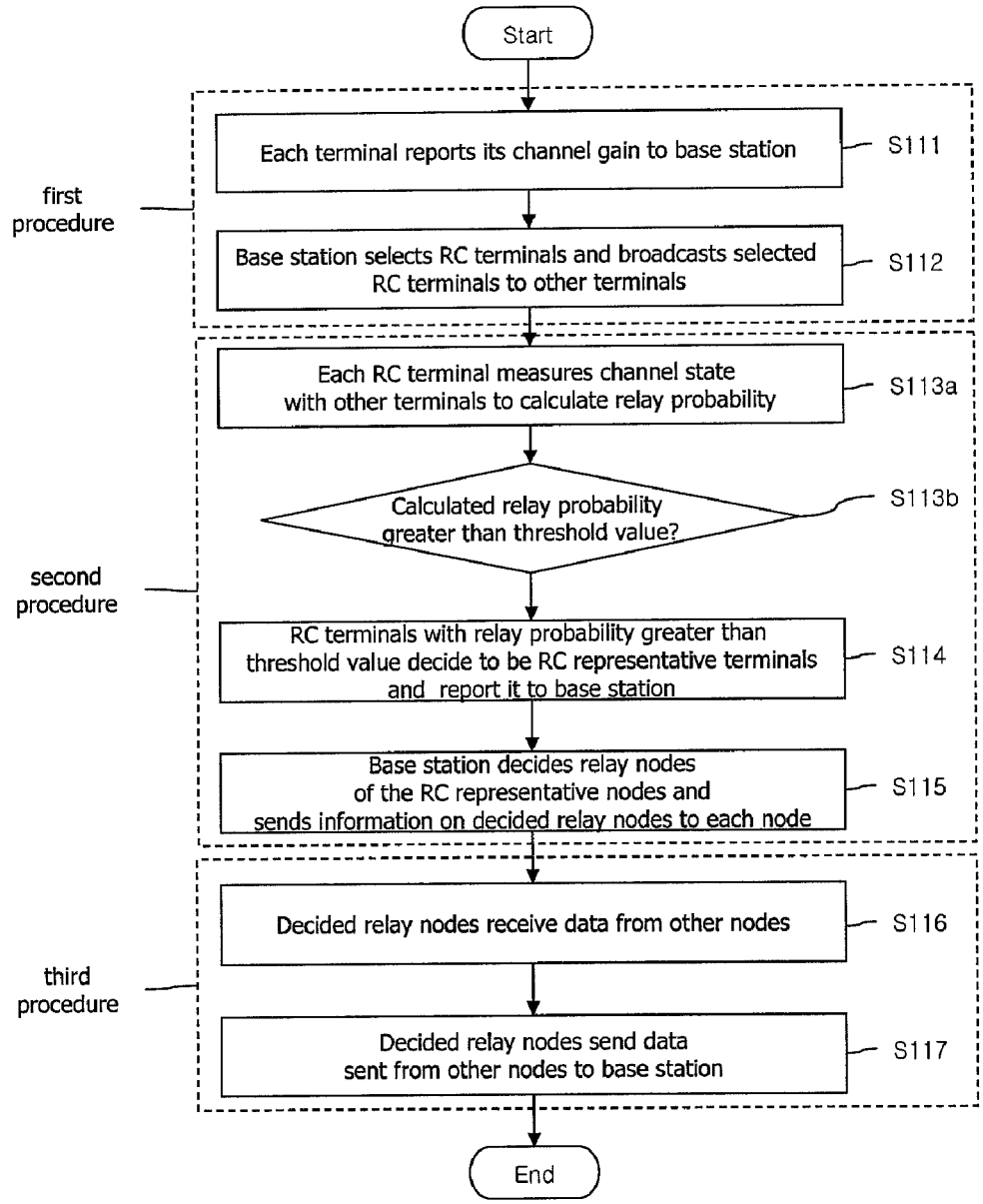
FIG. 3 is a flowchart illustrating a random routing method in accordance with the present invention.
Figure 4:
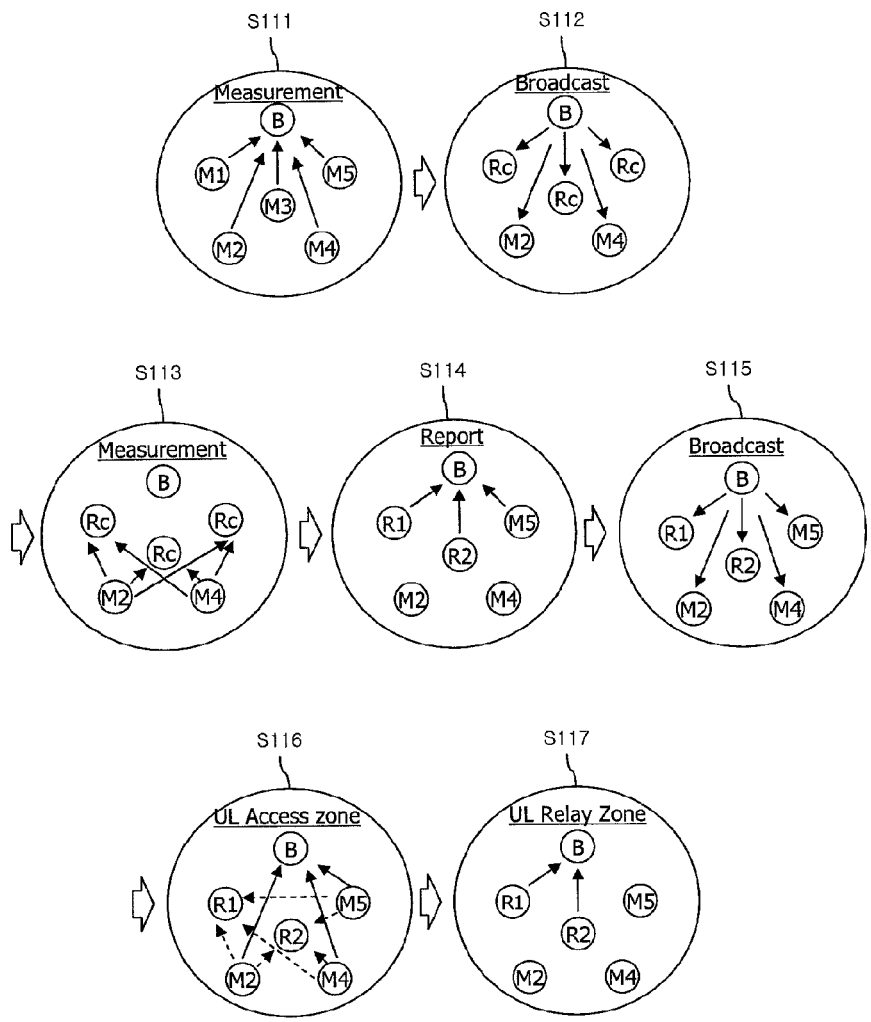
FIG. 4 is an exemplary view illustrating a concept of the random routing method in accordance with the present invention.

FIG. 3 is a flowchart illustrating a random routing method in accordance with the present invention, and FIG. 4 is an exemplary view illustrating a concept of the random routing method in accordance with the present invention.

As shown in FIGS. 3 and 4, a cellular system according to the present invention may include at least one terminal, a terminal selected from the at least one terminal for operating as a relay depending on circumstances, and a base station configured to demodulate and decode signals received from the at least one terminal and the relay terminal so as to extract original uplink information sent from terminals based upon the demodulated or decoded signals.

It is assumed that the cellular system is based upon TDMA for the sake of description, and each terminal and a base station operate in the form of half-duplex which does not support simultaneous transmission and reception. However, the assumption is merely intended for the sake of explanation, and the scope of the present invention may be applicable to FDMA, CDMA and OFDMA. Also, the cellular system according to the present invention may employ a full-duplex operation.

The random routing method according to the present invention in the cellular system may be divided into three procedures, namely, a first procedure of deciding relay candidate (RC) terminals of at least one terminal (S111, S112), a second procedure of deciding a representative terminal for the relay by the RC terminals (i.e., each candidate terminal decides whether to operate as a relay) and finally deciding by a base station a relay terminal of the representative terminals for the relay (S113 to S115), and a third procedure of sending uplink data from the terminals to the base station via the relay.

The first procedure, as shown in FIGS. 3 and 4, may include a measurement step S111 and a relay candidate decision and broadcasting step S112.

The second procedure may include measuring by the RC terminals and deciding by each of the RC terminals whether each is to operate as a relay, namely, to be a representative terminal for the relay (S113), reporting by the representative terminal for the relay (S114), and finally deciding a relay terminal by the base station and broadcasting information related to the decided relay terminal (S115).

The third procedure may include sending data by the other terminals (UL access zone) (S116), and sending data by the terminals operating as the relay (UL relay zone) (S117).

Hereinafter, each procedure will be described in detail.

1) The measurement step (S111) of the first procedure will be explained as follows.

Each of mobile terminals (indicated with 'M' in the drawing) M1, M2, M3, M4 and M5) located within the coverage of the base station (indicated with 'B' in the drawing) reports its channel gain to the base station.

2) The relay candidate decision and broadcasting step (S112) of the first procedure will be explained as follows.

The base station decides RC terminals based upon the reported channel gain information, and broadcasts information relating to the decided RC terminals to each terminal. Here, when deciding the RC terminals, the base station concerns about base station-terminal link quality, uplink data rate needed for the terminals, and the like. For example, terminals which have relatively good base station-terminal link qualities and requires a low uplink data rate may be decided as the RC terminals, of the at least one terminal. Upon deciding the RC terminals, if there is no limit to the number of RC terminals, there may be a chance of too many terminals being randomly decided as the relay at once. In this case, the performance of the overall system may disadvantageously be lowered. Furthermore, if there are too many RC terminals, during the measurement step S113 by the RC terminals, a problem of synchronization between the RC terminals and general terminals and a latency problem may possibly occur. In addition, if the excessive number of RC terminals are present, there may be a strong chance of not being selected as an representative terminal for the relay from the RC terminals during the decision step (S115) of the representative terminal for the relay of the RC terminals.

Accordingly, the base station should decide an appropriate number of RC terminals by concerning about circumstances of an access link and a relay link (e.g., traffic load, the number of terminals and the like).

Upon the decision of the appropriate number of RC terminals, the base station broadcasts information related to the decided RC terminals.

3) The measurement by the RC terminals and the decision as to whether to be an representative terminal for the relay (S113) of the second procedure will be described as follows.

The decided RC terminals determine the amount of uplink data which they will send to the base station.

Each of the decided RC terminals measures the channel state with other neighboring terminals and estimates a relay probability p based upon the channel state information (S113a).

The relay probability p may be decided (or controlled) by each of the RC terminals, namely, based upon the number of other terminals which can be supported by each of the RC terminals.

Here, supporting other terminals by the RC terminal indicates that the RC terminal may operate as a relay for neighboring terminals, and is defined as the moment when the channel gain between the RC terminals and the neighboring terminals exceeds a predetermined CQI threshold value.

$RC_i$ will decide a relay probability $p_i^{(t+1)}$ at a time point t+1 according to the following Equation.

$$p_i^{(t+1)} = p_i^t + \frac{\alpha_i^{t+1} - \alpha_i^t}{n(\text{cell})} \qquad \text{[Equation 1]}$$

where i denotes a relay identifier, $p_i^t$ denotes a relay probability of the RCi at a time point t, $\alpha_i^t$ and $\alpha_i^{(t+1)}$ denote the number of terminals supportable by the RCi, respectively, at a time pint t and a time point t+1, and n(cell) denotes the number of entire terminals present within the cell. α may be decided by a CQI threshold or a specific weight. For improving the aspect of fairness of each terminal, $a_i^t$ is set to 0 if a terminal remains as a general terminal at the time point t.

Each of the RC terminals decides whether to actually operate as a relay or a general terminal, namely, whether to become an representative terminal for the relay, based upon the amount of the uplink data and the calculated relay probability p.

In case of a less amount of uplink data, each of the RC terminals may become the representative terminal for the relay.

Also, whether to be the representative terminal for the relay is decided according to maximum threshold $P_{max}$ and minimum threshold $p_{min}$ of the relay probability p. That is, if the relay probability p exceeds the maximum threshold value $p_{max}$, the corresponding RC terminal is decided as the representative terminal, while operating as a general terminal if the relay probability p is lower than the minimum threshold $p_{min}$.

4) In the reporting step (S114) of the second procedure, the representative terminal for the relay reports its own information to the base station.

5) Description will now be given of the final relay decision by the base station and the broadcasting of information on the decided relay terminal (S115) of the second procedure.

The base station receives information relating to the representative terminal for the relay, and finally decides appropriate terminals as relays among the representative terminals for the relay. Here, there may be a limit to the number of terminals which can operate as the relay. In other words, the excessive number of relays existing may cause reduction of resources useable by general terminals, among entire resources within the base station. Therefore, the base station decides an appropriate number of relays by concerning about the amount of uplink data sent from terminals within the base station coverage.

The base station also broadcasts information relating to the finally decided relay terminal to the whole cell. The broadcast information may include information related to which terminal finally operates as a relay, and resource allocation information for each terminal (e.g., time slot and frequency resource).

6) The step of sending data by other terminals of the third procedure (UL access zone) (S116) will be described as follows.

The other terminals (e.g., M2, M4 and M5 of FIG. 4) send data to the base station (UL access zone). Here, the other terminals may send the data by way of coding (e.g., spreading or scrambling) using network codes sent from the base station.

Accordingly, the finally decided relay terminals (e.g., R1 and R2 of FIG. 4) listen to (or overhear) the data from the other terminals.

7) The step (S117) of sending data by a terminal operating as a relay of the third procedure will be described as follows.

The relay terminals (e.g., R1 and R2 of FIG. 4) multiplex the data sent from the other terminals and send the multiplexed data to the base station.

The aforesaid steps S111 to S115 are steps for performing link setup, so they may be semi-statically performed periodically at a plurality of frame sections. Here, the frame may be composed of a plurality of time slots, a plurality of transmission time intervals (TTIs) or a plurality of subframes. Also, the steps S113 to S115 may be performed every specific period, thereby changing the relay.

Figure 5:
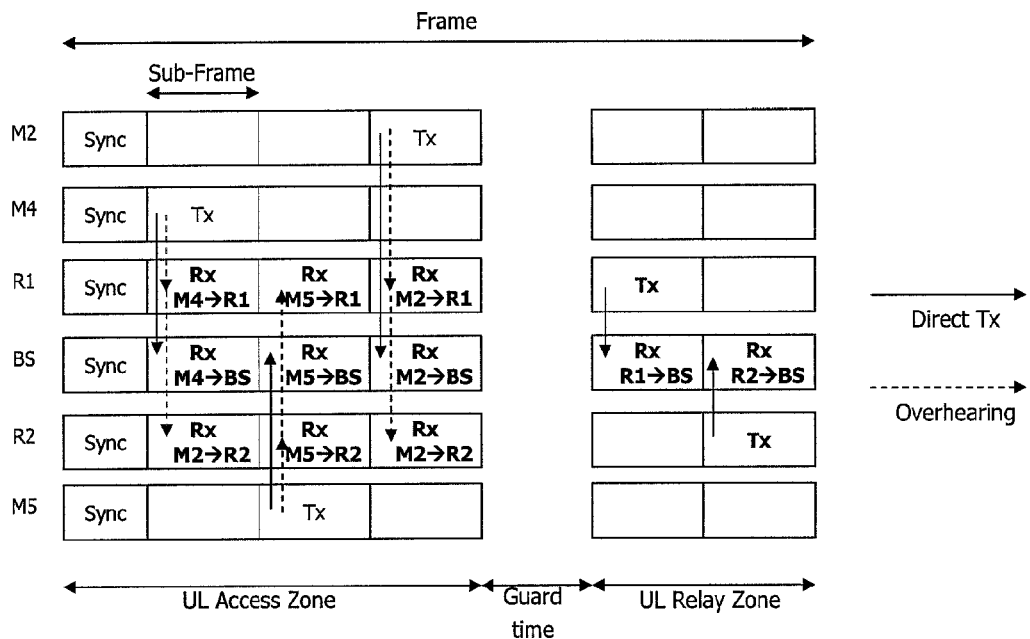
FIG. 5 is an exemplary view illustrating a frame structure to which a random network coding method according to the present invention is applied.

FIG. 5 is an exemplary view illustrating a frame structure to which a random network coding method according to the present invention is applied.

As illustrate in FIG. 5, the frame structure may include uplink data by terminals (UP access zone), and uplink data by relays (UL relay zone). Each of the uplink data by the terminals and the uplink data by the relays may include several subframes.

General terminals (e.g., M2, M4 and M5) operate in TDMA during the UL access zone to directly send their own data to the base station BS (i.e., direct transmission). Here, the general terminals M2, M4 and M5 may send the data through coding (e.g., spreading or scrambling) using network codes which were already sent from the base station and stored.

Here, since the data is broadcast due to the characteristic of wireless channel, the terminals R1 and R2 operating as a relay may overhear the data.

For signals with high intensity of the overheard data signals, the relay terminals R1 and R2 decode the data as symbols and store the decoded symbols in a decoding set. Here, the relay terminals R1 and R2 may decode (e.g., despread or descramble) the data sent from the general terminals using the network codes which were already sent from the base station and stored.

The relay terminals R1 and R2 then linearly combine (i.e., multiplex) the symbols which were received/decoded during the UL access zone into one signal. Here, the relay terminals R1 and R2 may already have random coefficient values as many as the number of terminals in the form of vector, in order to use for the linear combination of the received signals. Such random coefficient vectors may be values which are set in the base station so as to be sent to each relay station.

Afterwards, the relay terminals R1 and R2 send the multiplexed signal to the base station BS during the UL relay zone.

The base station BS then decodes the original uplink data sent from the general terminals M2, M4 and M5 by use of the directly received signals from the general terminals M2, M4 and M5 during the UL access zone and the received signals from the relay terminals R1 and R2 during the UL relay zone. That is, the data from the relay terminals may be used for error correction.

An example of such operation is described hereinafter.

It is assumed that the relay terminals R1 and R2 receive random coefficient vectors $A=[a_1, a_2, a_3]$ and $B=[b_1, b_2, b_3]$ from the base station and store the same.

It is also assumed that symbols sent from the general terminals M2, M4 and M5 to the base station during the UL access zone are $s_1$, $s_2$ and $s_3$. Here, it is assumed that the relay terminal R1 overhears and decodes the symbols $s_1$, $s_2$ and $s_3$, and the relay terminal R2 overhears and decodes the symbols $s_2$ and $s_3$.

The relay terminal R1 generates a new symbol named $Sym_1=a_1s_1+a_2s_2+a_3s_3$ using the three decoded symbols $s_1$, $s_2$ and $s_3$ and its own random coefficient vector A. Also, the relay terminal R2 generates a new symbol named $Sym_2=b_2s_2+b_3s_3$, which is linearly combined, using the two decoded symbols $s_2$ and $s_3$ and its random coefficient vector B. Here, every linear combination is defined in Galois field.

Afterwards, the relay terminals R1 and R2 send the signals $Sym_1$ and $Sym_2$ linear combined during the UL relay zone to the base station BS, respectively.

The base station BS then decodes the original symbols $s_1$, $s_2$ and $s_3$ by using the symbols $s_1$ and $s_2$ and $s_3$ directly sent from the general terminals M2, M4 and M5 within the UL access zone and the coded symbols $Sym_1$ and $Sym_2$ received from the relay terminals R1 and R2 within the UL relay zone. That is, the data from the relay terminals may be used for error correction.

Here, the decoding may use the following linear equation.

$$CX = Y \quad \text{[Equation 2]}$$

C: Coefficient Matrix

X: symbol sent from a terminal ($[x1, x2, \ldots, xm]$)

Y: symbol received by the base station

C matrix may be generated according to the following algorithm.

1) If r terminals of m+r terminals in number present in a system act as a relay, the base station generates a zero matrix in an m-column, r-row size.

2) If the signal sent from the $k^{th}$ terminal within the UL access zone has successfully been decoded in the base station, 1 is filled in (k, k) position of the zero matrix.

3) If the signal sent from the $n^{th}$ relay terminal in the UL relay zone has successfully been decoded in the base station BS and the $k^{th}$ terminal is present in a decoding set of the $n^{th}$ relay terminal, the $k^{th}$ element of the random coefficient vector of the $n^{th}$ relay terminal is filled in (m−r+n, k) position of C matrix.

Consequently, the signal X sent from each general terminal M2, M4 and M5 may be acquired by solving the linear equation.

Here, if a terminal of the relay terminals is decided to act as a general terminal based upon the relay probability (corresponding to M3 in the above example), the associated data may be neither decoded in the relay terminals R1 and R2, nor multiplexed to be sent to the base station. This is intended to prevent deterioration of a network coding gain, which is caused due to unknown CQI information (i.e., channel state) between the general terminal M3 and the relay terminals.

As described above, a terminal operating as a relay according to the related art merely manages amplification/relay of signals from other terminals, whereas in accordance with the present invention, terminals selected as relays perform so-called coding in a network, such that the relay terminals receive signals from several neighboring terminals and multiplex such signals into one signal so as to sent to a base station.

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

The invention claimed is:

1. A method for relaying data in a multi-hop cellular system comprising:
   receiving, by a terminal, from a base station a notification as to whether the terminal is decided as a candidate for a relay;
   measuring, by the terminal, the channel state with other terminals if the terminal is decided as the candidate for the relay;
   calculating a probability to be selected as the relay based upon the channel state to decide whether to be the representative candidate based upon the calculated probability;
   sending, by the terminal, to the base station a notification if the terminal is decided as the representative candidate for the relay; and
   relaying data received from the other terminals to the base station if the terminal is notified from the base station as to that the terminal is finally decided as the relay,
   wherein the probability is calculated according to:

$$p_i^{(t+1)} = p_i^t + \frac{\alpha_i^{t+1} - \alpha_i^t}{n(\text{cell})}$$

where $p_i^t$ denotes a probability of the relay candidate to be the relay at a time point t,
$\alpha_i^t$ and $\alpha_i^{(t+1)}$ denote the number of terminals supportable by i-th relay candidate at a time pint t and a time point t+1,
n(cell) denotes the number of entire terminals present within the cell, and
i denotes a relay candidate identifier.

2. The method of claim 1, wherein in the calculating of the probability, if the calculated probability exceeds a preset threshold value, the terminal is decided as the representative relay candidate.

3. The method of claim 1, the method further comprising:
   calculating an amount of uplink data to be sent when the terminal decides whether to be the representative candidate based upon the calculated probability.

4. The method of claim 3, wherein the amount of the uplink data is concerned prior to the channel state with the other terminals.

5. A terminal relaying data in a multi-hop cellular system, the terminal comprising:
   a radio frequency (RF) module; and
   a processor configured to:
      control the RF module,
      receive, from a base station, a notification as to whether the terminal is decided as a candidate for a relay,
      measure the channel state with other terminals if the terminal is decided as the candidate for the relay,
      calculate a probability to be selected as the relay based upon the channel state, to decide whether to be the representative candidate based upon the calculated probability,
      send, to the base station, a notification if the terminal is decided as the representative candidate for the relay, and
      relay data received from the other terminals to the base station if the terminal is notified from the base station as to that the terminal is finally decided as the relay,
   wherein the probability is calculated according to:

$$p_i^{(t+1)} = p_i^t + \frac{\alpha_i^{t+1} - \alpha_i^t}{n(\text{cell})}$$

where $p_i^t$ denotes a probability of the relay candidate to be the relay at a time point t,
$\alpha_i^t$ and $\alpha_i^{(t+1)}$ denote the number of terminals supportable by i-th relay candidate at a time pint t and a time point t+1,
n(cell) denotes the number of entire terminals present within the cell, and
i denotes a relay candidate identifier.

6. The terminal of claim 5, wherein the processor is further configured to decide that the terminal is decided as the representative relay candidate, if the calculated probability exceeds a preset threshold value.

7. The terminal of claim 5, wherein the processor is further configured to calculate an amount of uplink data to be sent when the terminal decides whether to be the representative candidate based upon the calculated probability.

8. The terminal of claim 7, wherein the amount of the uplink data is concerned prior to the channel state with the other terminals.

* * * * *